United States Patent
Ramamurthy

(10) Patent No.: US 7,987,672 B2
(45) Date of Patent: Aug. 2, 2011

(54) TURBOCHARGER PROTECTION SYSTEMS AND METHODS

(75) Inventor: Ravishankar Ramamurthy, Livonia, MI (US)

(73) Assignee: GM Global Technology Operations LLC

( * ) Notice: Subject to any disclaimer, the term of this patent is extended or adjusted under 35 U.S.C. 154(b) by 683 days.

(21) Appl. No.: 12/043,211

(22) Filed: Mar. 6, 2008

(65) Prior Publication Data

US 2009/0183508 A1 Jul. 23, 2009

Related U.S. Application Data

(60) Provisional application No. 61/022,605, filed on Jan. 22, 2008.

(51) Int. Cl.
| F02D 23/00 | (2006.01) |
| F02D 43/00 | (2006.01) |
| F01N 3/00 | (2006.01) |
| F01N 5/04 | (2006.01) |
| F01N 3/02 | (2006.01) |
| F01N 3/24 | (2006.01) |

(52) U.S. Cl. ............ 60/601; 60/295; 60/297; 60/280; 60/285; 60/286

(58) Field of Classification Search ............ 60/600–603, 60/291, 280, 285, 295, 297; 340/606; F02D 43/00; F01N 3/02, 3/24

See application file for complete search history.

(56) References Cited

U.S. PATENT DOCUMENTS

| 4,589,254 A * | 5/1986 | Kume et al. ........... 60/286 |
| 6,279,551 B1 * | 8/2001 | Iwano et al. ........... 123/564 |
| 6,698,192 B2 * | 3/2004 | Ootake ........... 60/297 |
| 6,756,904 B2 * | 6/2004 | Kinugawa et al. ........... 340/606 |
| 6,941,750 B2 * | 9/2005 | Boretto et al. ........... 60/297 |
| 6,978,602 B2 * | 12/2005 | Ohtake et al. ........... 60/285 |
| 7,043,900 B2 * | 5/2006 | Shirakawa et al. ........... 60/280 |
| 7,107,770 B2 * | 9/2006 | Shirakawa ........... 60/297 |
| 7,171,803 B2 * | 2/2007 | Saito et al. ........... 60/297 |
| 7,174,706 B2 * | 2/2007 | Kuboshima et al. ........... 60/297 |
| 7,322,184 B2 * | 1/2008 | Kondou et al. ........... 60/297 |
| 2008/0078236 A1 * | 4/2008 | Mital et al. ........... 73/38 |
| 2008/0264045 A1 * | 10/2008 | Hara et al. ........... 60/295 |
| 2009/0018784 A1 * | 1/2009 | Dintino et al. ........... 702/50 |

FOREIGN PATENT DOCUMENTS

JP 2007040269 A * 2/2007

* cited by examiner

*Primary Examiner* — Thai Ba Trieu

(57) ABSTRACT

A turbocharger protection system for an engine system that includes a particulate filter and a turbocharger comprises a delta pressure estimator that estimates a pressure difference in a particulate filter. A pressure factor estimator module estimates a pressure factor based on the difference and barometric pressure. A fuel limit estimator module protects the turbocharger by selectively limiting fuel injection to the engine based on the pressure factor.

18 Claims, 4 Drawing Sheets

TURBOCHARGER PROTECTION SYSTEMS AND METHODS

CROSS-REFERENCE TO RELATED APPLICATIONS

This application claims the benefit of U.S. Provisional Application No. 61/022,605, filed on Jan. 22, 2008. The disclosure of the above application is incorporated herein by reference.

FIELD

The present disclosure relates to methods and systems for controlling fuel injection.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engines typically have higher efficiency than gasoline engines due to an increased compression ratio and a higher energy density of diesel fuel. A diesel combustion cycle produces particulates that are typically filtered from diesel exhaust gas by a particulate filter (PF) that is disposed in the exhaust stream. Over time, the PF becomes full and the trapped diesel particulate matter (PM) must be removed. To remove the PM, the PM is burned within the PF.

Burning of PM inside the PF, also known as regeneration, produces ash as a byproduct. Engine back pressure increases due to the presence of ash and trapped soot in the PF. The back pressure increase can be partially alleviated by performing regeneration. However, the remaining ash can result in a static irreversible increase in back pressure. The increase in engine back pressure subjects the engine to higher pumping losses and lowers the overall engine efficiency. Turbine efficiency falls with the increase of pumping losses, since the turbocharger struggles to push the same amount of air under these conditions. The loss in turbine efficiency translates to higher exhaust temperatures, which in turn negatively affects components of the turbocharger.

SUMMARY

A turbocharger protection system for an engine system that includes a particulate filter and a turbocharger comprises a delta pressure estimator that estimates a pressure difference in a particulate filter. A pressure factor estimator module estimates a pressure factor based on the difference and barometric pressure. A fuel limit estimator module protects the turbocharger by selectively limiting fuel injection to the engine based on the pressure factor.

A turbocharger protection method that controls an engine system including a particulate filter and a turbocharger comprises estimating a pressure difference in the particulate filter; estimating a pressure factor based on the difference and barometric pressure; and protecting the turbocharger by limiting fuel injection to the engine based on the pressure factor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
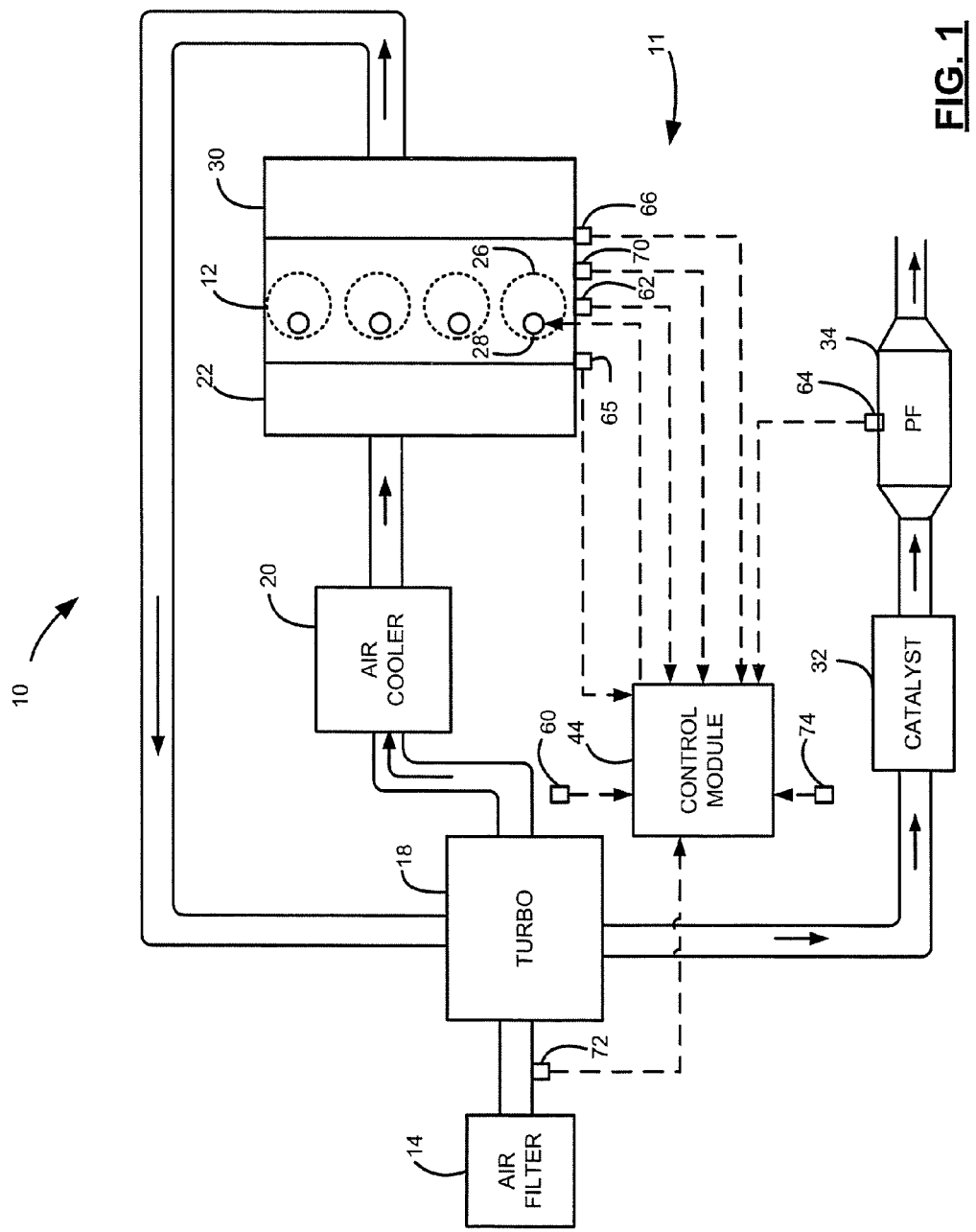
FIG. 1 is a functional block diagram of a vehicle including a turbocharger protection system according to various aspects of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle 10 including a diesel engine system is schematically illustrated in accordance with the present disclosure. It is appreciated that the diesel engine system is merely exemplary in nature and that the turbocharger protection system described herein can be implemented in various engine systems implementing a turbocharger and a particulate filter. For ease of the discussion, the remainder of the disclosure will be discussed in the context of a diesel engine system.

As shown, a turbocharged diesel engine system 11 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 11. Generally, the greater the compression of the air, the greater the output of the engine 12. Compressed air then passes through an air cooler 20 before entering into an intake manifold 22.

Air within the intake manifold 22 is distributed into cylinders 26. Although four cylinders 26 are illustrated, it is appreciated that the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a v-type cylinder configuration.

Fuel is injected into the cylinders 26 by fuel injectors 28. Heat from the compressed air ignites the air/fuel mixture.

Combustion of the air/fuel mixture creates exhaust. Exhaust exits the cylinders 26 into an exhaust system.

The exhaust system includes an exhaust manifold 30, a diesel oxidation catalyst (DOC) 32, and a particulate filter (PF) 34. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32 and the PF 34. The DOC 32 oxidizes the exhaust based on the post combustion air/fuel ratio. The amount of oxidation increases the temperature of the exhaust. The PF 34 receives exhaust from the DOC 32 and filters any soot particulates present in the exhaust.

Figure 2:
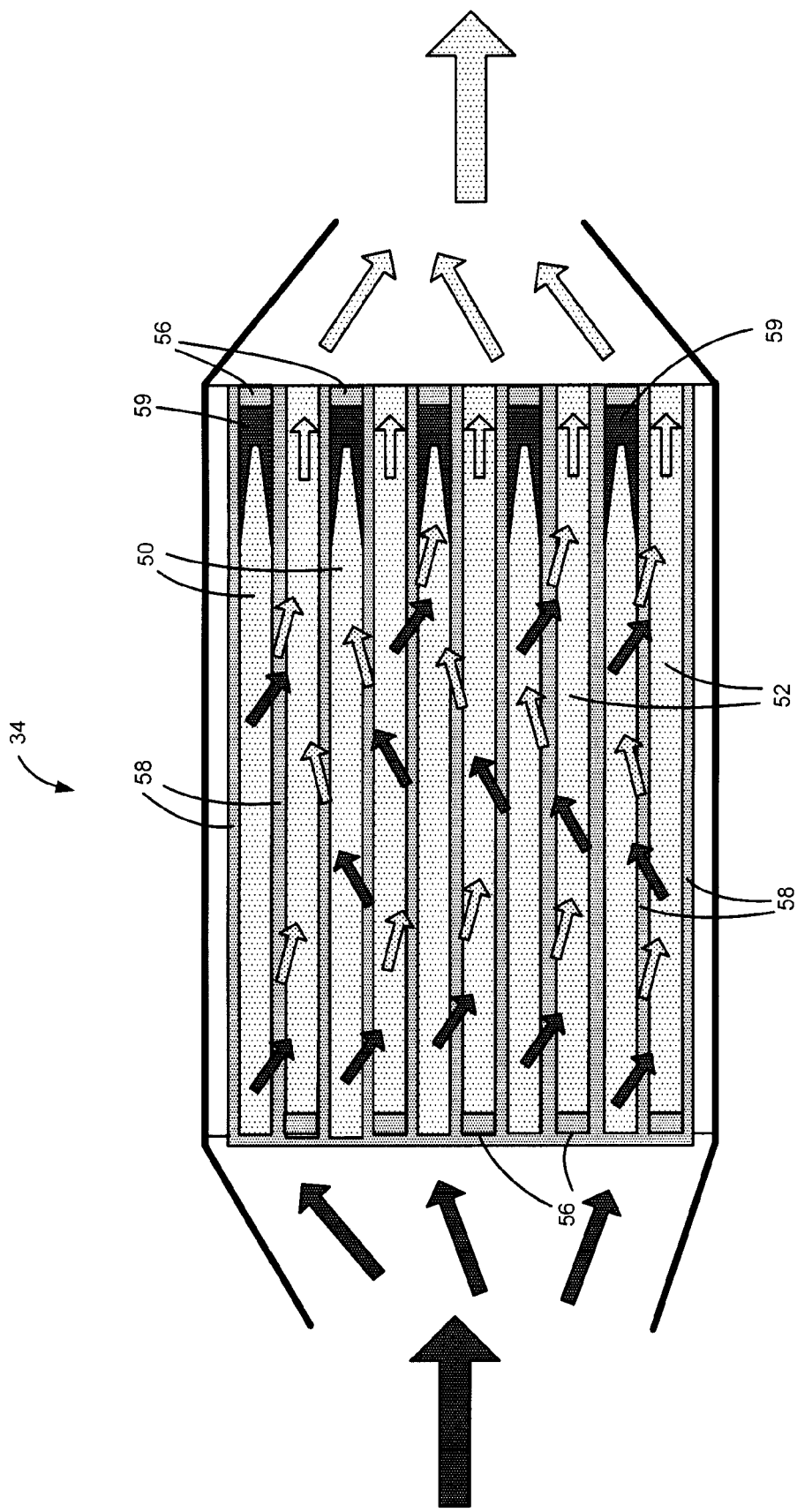
FIG. 2 is an illustration of a particulate filter of the vehicle of FIG. 1 according to various aspects of the present disclosure.

With particular reference to FIG. 2, an exemplary PF 34 is shown. The exemplary PF 34 is a monolith particulate trap and includes alternating closed cells/channels 50 and opened cells/channels 52. The cells/channels 50,52 are typically square cross-sections, running axially through the part. Walls 58 of the PF 34 are preferably comprised of a porous ceramic honeycomb wall of cordierite material. It is appreciated that any ceramic comb material is considered within the scope of the present invention. Adjacent channels are alternatively plugged at each end as shown at 56. This forces the diesel aerosol through the porous substrate walls, which act as a mechanical filter. Particulate matter is deposited within the closed channels 50 and exhaust exits through the opened channels 52. Soot particles 59 flow into the PF 34 and are trapped therein. An accumulation of the soot particles increases the pressure drop in the PF 34.

With reference back to FIG. 1, a control module 44 controls the engine 12 and PF regeneration based on various sensed information. For example, a barometric pressure sensor 60 measures barometric pressure surrounding the vehicle 10 and generates a barometric pressure signal accordingly. An engine speed sensor 62 measures a rotational speed of the engine 12 and generates an engine speed signal accordingly. A PF delta pressure sensor 64 measures a difference in pressure of exhaust gases flowing through the PF 34 and generates a PF pressure difference signal accordingly. A fuel temperature sensor 66 measures a temperature of the engine fuel and generates a fuel temperature signal accordingly.

A coolant temperature sensor 65 measures a temperature of engine coolant and generates a coolant temperature accordingly. An oil temperature sensor 70 measures a temperature of engine oil and generates an oil temperature signal accordingly. An intake air temperature 72 measures a temperature of air entering the engine 12 and generates an intake air temperature accordingly. A vehicle speed sensor 74 measures a speed of the vehicle 10 and generates a vehicle speed signal accordingly. As can be appreciated, other sensors and methods may be employed to sense and/or determine the values for the above mentioned signals.

Generally speaking, the control module 44 receives one of more of the above mentioned signals and adjusts fuel injection rates to reduce power during high back pressure conditions to reduce turbine inlet temperatures. For example, the PF pressure difference signal sensed by the PF delta pressure sensor 64 is filtered at a specified rate to reduce noise in the signal. At any given barometric pressure condition and engine speed condition, based on the sensed pressure drop across the PF 34, fuel injection quantities are limited to reduce inlet temperatures of the turbine.

In one example, the limiting is performed gradually so as to not be perceived by the driver of the vehicle 10. In another example, an engine protection strategy arbitrates amongst various fuel quantity limiting factors such as, for example, factors indicating high engine temperatures to protect the life of the engine without compromising engine power and drivability.

Figure 3:
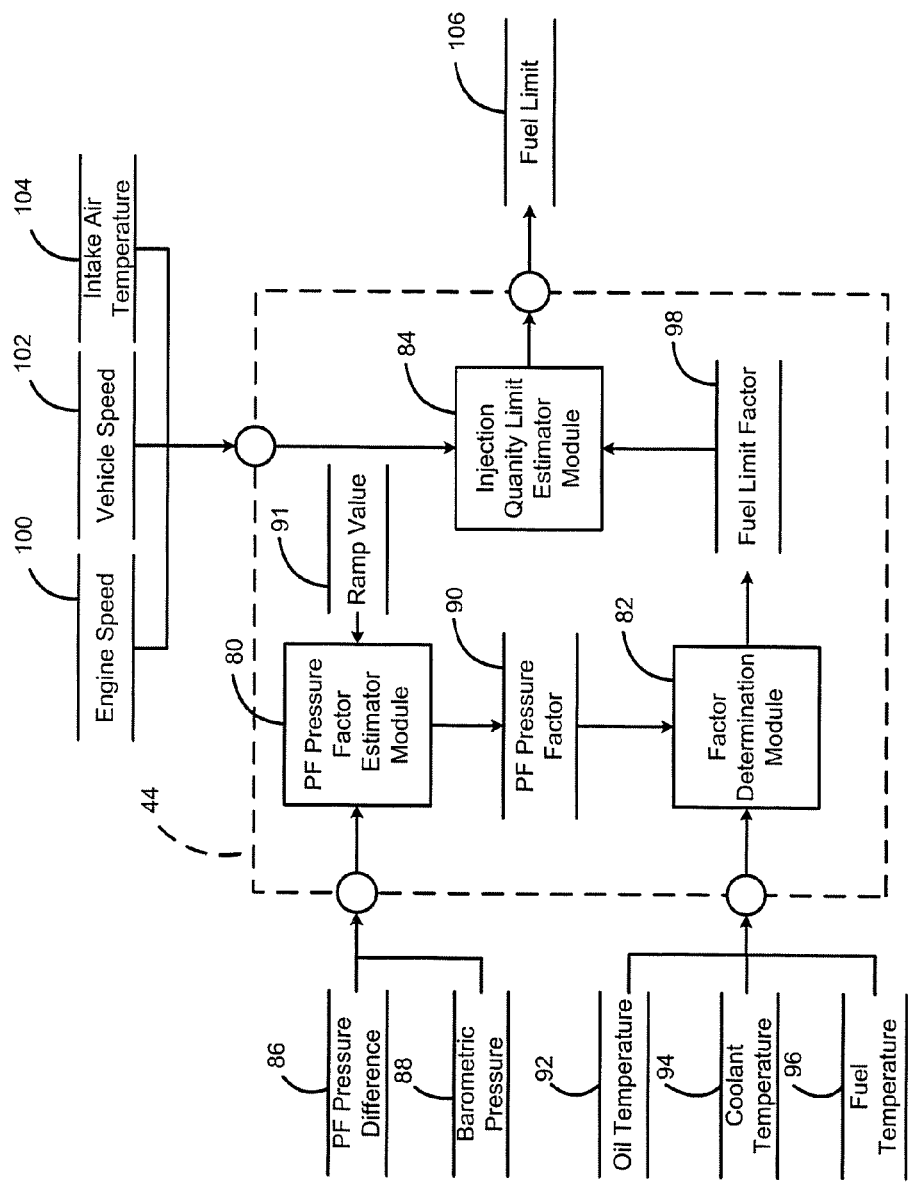
FIG. 3 is a data flow diagram illustrating a turbocharger protection system according to various aspects of the present disclosure.

With reference to FIG. 3, a dataflow diagram illustrates various embodiments of a turbocharger protection system that may be embedded within the control module 44. Various embodiments of turbocharger protection systems according to the present disclosure may include any number of sub-modules embedded within the control module 44. The sub-modules shown may be combined and/or further partitioned to similarly control engine components to protect the turbocharger from damage. Inputs to the system may be sensed from the vehicle 10 (FIG. 1), received from other control modules (not shown) within the vehicle 10 (FIG. 1), and/or determined by other sub-modules (not shown) within the control module 44. In various embodiments, the control module 44 of FIG. 3 includes a PF pressure factor estimator module 80, a fuel limit factor determination module 82, and an injection quantity limit estimator module 84.

The PF pressure factor estimator module 80 receives as input a PF pressure difference 86 and barometric pressure 88. The PF pressure factor estimator module 80 filters the PF pressure difference 86 if the PF pressure difference 86 is coming from a sensed signal to reduce inaccuracies in the signal due to noise. Based on the filtered difference and the barometric pressure 88, the PF pressure factor estimator module 80 estimates a PF pressure factor 90, for example, by way of a predetermined lookup table indexed by the barometric pressure 88 and the filtered PF pressure difference 86.

In various embodiments, the PF pressure factor estimator module 80 sets the PF pressure factor 90 to a maximum value if one of the following conditions is true: there is a sensor failure or the bit by bit comparison of an applicable mask does not correspond to the status word. The maximum can be adjusted to allow the factor to ramp up or ramp down. For example only, the PF pressure factor estimator module 80 can ramp the PF pressure factor 90 up or down by adjusting the PF pressure factor 90 up or down by a ramp value 91 over each predetermined interval. The ramp value 91 can be a ramp up value or a ramp down value. The ramp value 91 may be based on the direction of the ramp. For example only, the ramp value 91 can be the ramp up value to ramp the PF pressure factor 90 up, and the ramp value 91 can be the ramp down value to ramp the PF pressure factor 90 down.

The factor determination module 82 receives as input the PF pressure factor 90, oil temperature 92, coolant temperature 94, and/or fuel temperature 96. The factor determination module 82 determines a fuel limit factor 98 by arbitrating amongst one or more factors. For example, the factor determination module sets the fuel limit factor 98 to a minimum of four factors. Three of the four factors are determined from the oil temperature 92, the coolant temperature 94, and the fuel temperature 96, for example, by way of a one or a two dimensional lookup table indexed by the oil temperature 92, the coolant temperature 94, and/or the fuel temperature 96. The fourth factor is the PF pressure factor 90.

The injection quantity limit estimator module 84 receives as input the fuel limit factor 98, engine speed 100, vehicle speed 102, and/or intake air temperature 104. The injection quantity limit estimator module 84 generates a fuel injection limit 106 based on the vehicle speed 102 or the engine speed 100 and the intake air temperature 104, for example, by: determining an engine speed factor and a vehicle speed factor based on the engine speed 100, the vehicle speed 102 and the fuel limit factor 98; and determining a minimum of the engine speed factor and the vehicle speed factor. The minimum is then multiplied by an intake air temperature factor that is determined from the intake air temperature 104 and the engine speed 100, for example, by way of a predetermined look up table indexed by the intake air temperature 104 and the engine speed 100.

The fuel injection limit 106, if based on the PF pressure factor 90, then protects the turbocharger 18 (FIG. 1) from exceeding a maximum temperature due to the increase in engine back pressure at certain operating conditions (i.e., high speeds and loads).

Figure 4:
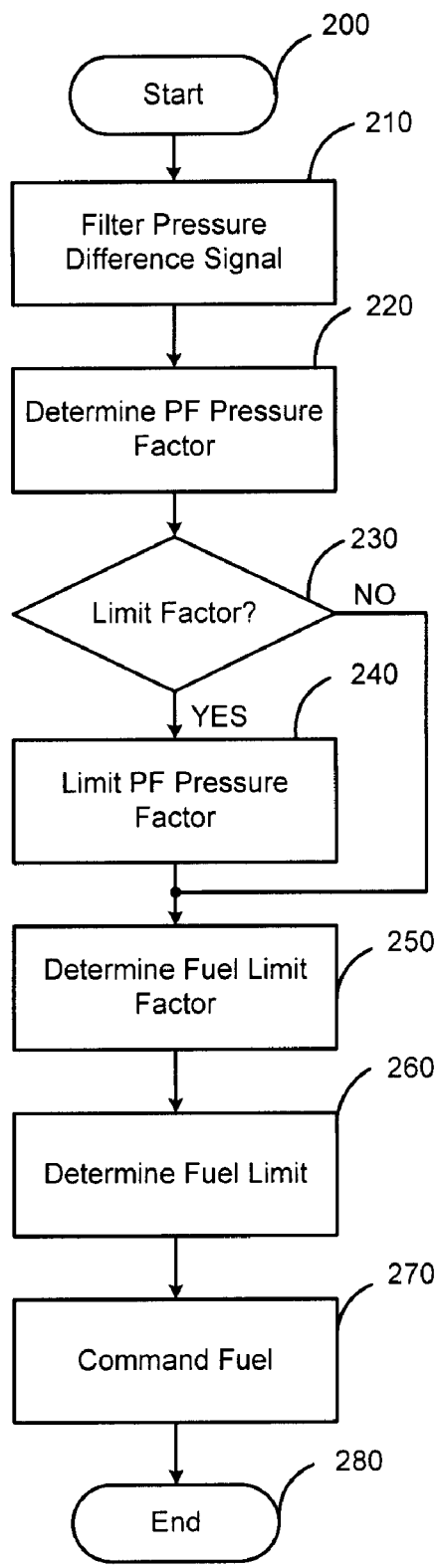
FIG. 4 is a flowchart illustrating a turbocharger protection method according to various aspects of the present disclosure.

Referring now to FIG. 4, a flowchart illustrates a turbocharger protection method that can be performed by the turbocharger protection system of FIG. 3 in accordance with various aspects of the present disclosure. As can be appreciated, the order of execution of the steps of the turbocharger protection method can vary without altering the spirit of the method. The method may be performed periodically during control module operation or scheduled to run based on certain events.

In one example, the method may begin at 200. The PF pressure difference 86 is received and filtered at 210. The PF pressure factor 90 is estimated based on the filtered PF pressure difference 86 and the barometric pressure 88 at 220. The limit conditions as discussed above are evaluated at 230 to determine if the PF pressure factor 90 should be limited at 230. If the PF pressure factor 90 should be limited at 230, the PF pressure factor 90 is limited based on the predetermined step value at 240 as discussed above.

Otherwise, if the PF pressure factor 90 should not be limited at 230, the fuel limit factor 98 is determined at 250. The fuel injection limit 106 is then determined based on the fuel limit factor 98, the engine speed 100, the vehicle speed 102, and/or the intake air temperature 104 at 260 and fuel is commanded based on the fuel injection limit 106 at 270. The method may end at 280.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A turbocharger protection method that controls an engine system including a particulate filter and a turbocharger, comprising:
   estimating a pressure difference in the particulate filter;
   estimating a pressure factor based on the pressure difference and barometric pressure; and
   limiting fuel injection to the engine based on the pressure factor.

2. The method of claim 1 wherein estimating the pressure factor is further based on a lookup table indexed by the pressure difference and the barometric pressure.

3. The method of claim 1 wherein the estimating the pressure difference is performed by a delta pressure sensor that senses the pressure difference in the particulate filter.

4. The method of claim 3 further comprising filtering the pressure difference and wherein the estimating the pressure factor is based on the filtered difference.

5. The method of claim 1 further comprising adjusting the pressure factor based on a ramp value.

6. The method of claim 5 wherein the adjusting further comprises adjusting the pressure factor at least one of up and down based on the ramp value.

7. The method of claim 1 further comprising limiting the fuel injection to the engine further based on at least one of engine speed, vehicle speed, and intake air temperature.

8. The method of claim 1 further comprising determining a fuel limit factor based on the pressure factor and one or more engine protection factors
   wherein the limiting the fuel injection to the engine is based on the fuel limit factor.

9. The method of claim 8 wherein the one or more engine protection factors are based on at least one of fuel temperature, engine oil temperature, and engine coolant temperature.

10. A turbocharger protection system for an engine system that includes a particulate filter and a turbocharger, comprising:
    a delta pressure estimator that estimates a pressure difference in a particulate filter;
    a pressure factor estimator module that estimates a pressure factor based on the pressure difference and barometric pressure; and
    a fuel limit estimator module that limits fuel injection to the engine based on the pressure factor.

11. The system of claim 10 wherein the pressure factor estimator module estimates the pressure factor based on a lookup table indexed by the pressure difference and the barometric pressure.

12. The system of claim 10 wherein the delta pressure estimator is a delta pressure sensor that estimates the pressure difference by sensing the pressure difference in the particulate filter.

13. The system of claim 12 wherein the pressure factor estimator module filters the pressure difference and estimates the pressure factor based on the filtered difference.

14. The system of claim 10 wherein the pressure factor estimator module adjusts the pressure factor based on a ramp value.

15. The system of claim 14 wherein the ramp value is at least one of a ramp up and a ramp down value.

16. The system of claim 10 wherein the fuel limit estimator module limits the fuel injection to the engine further based on at least one of engine speed, vehicle speed, and intake air temperature.

17. The system of claim 10 further comprising a fuel limit factor determination module that determines a fuel limit factor based on the pressure factor and one or more engine protection factors and wherein the fuel limit estimator module selectively limits fuel injection to the engine based on the fuel limit factor.

18. The system of claim 17 wherein the one or more engine protection factors are based on at least one of fuel temperature, engine oil temperature, and engine coolant temperature.

* * * * *